June 17, 1969  N. S. BLISS  3,449,989
CABLE ECCENTRICITY CONTROL
Filed June 29, 1967  Sheet _1_ of 5

Inventor
NORMAN S. BLISS
By Edward Goldberg
Attorney

June 17, 1969   N. S. BLISS   3,449,989
CABLE ECCENTRICITY CONTROL
Filed June 29, 1967

Inventor
NORMAN S. BLISS
By Edward Goldberg
Attorney

June 17, 1969  N. S. BLISS  3,449,989
CABLE ECCENTRICITY CONTROL
Filed June 29, 1967

Inventor
NORMAN S. BLISS
By Edward Goldberg
Attorney

June 17, 1969  N. S. BLISS  3,449,989
CABLE ECCENTRICITY CONTROL

Filed June 29, 1967  Sheet 4 of 5

Inventor
NORMAN S. BLISS
By Edward Goldberg
Attorney

June 17, 1969 N. S. BLISS 3,449,989
CABLE ECCENTRICITY CONTROL
Filed June 29, 1967 Sheet 5 of 5
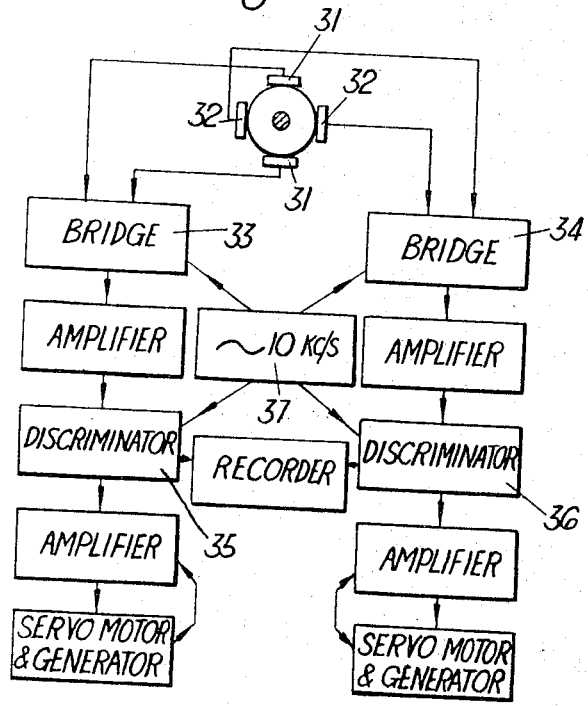
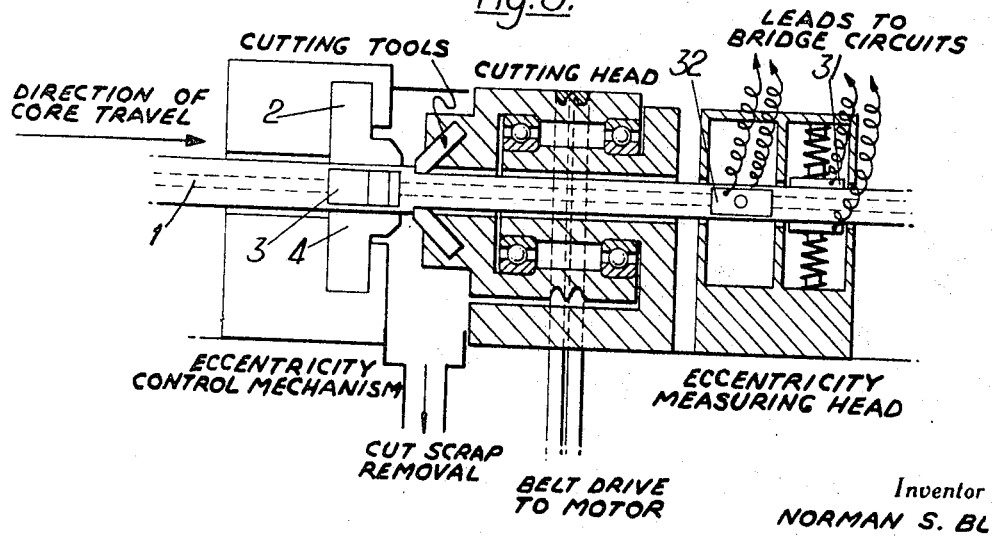
Inventor
NORMAN S. BLISS
By Edward Goldberg
Attorney United States Patent Office 3,449,989
Patented June 17, 1969

3,449,989
CABLE ECCENTRICITY CONTROL
Norman Stanley Bliss, East Wellow, near Romsey, England, assignor to International Standard Electric Corporation, New York, N.Y., a corporation of Delaware
Filed June 29, 1967, Ser. No. 650,130
Claims priority, application Great Britain, Aug. 16, 1966, 36,535/66
Int. Cl. B23b 5/36, 25/00
U.S. Cl. 82—20          8 Claims

ABSTRACT OF THE DISCLOSURE

Pairs of guide members are positioned on opposite sides of a cable to align the axis of the central conductor and to position the conductor symmetrically with respect to the insulation. The guide members are controlled by a sensing device and feedback arrangement.

BACKGROUND OF THE INVENTION

Field of the invention

This invention relates to an arrangement for moving the axis of a cable of variable diameter and eccentricity to obtain a symmetrically positioned central conductor and uniform insulation.

Description of the prior art

In the manufacture of insulated wires and cables, variations occur in both the diameter of the extruded insulation and in the eccentricity of the central conductor with respect to the insulation, so that the capacitance of the insulated wire or cable is not constant. However, in cables for use as transmission lines of some length, such as submarine cables, uniform capacitance is essential for accurate positioning of repeaters to restore power lost by signal attenuation through the cable. Uniform capacitance is also desirable to reduce reflections of high frequency waves which would occur at any discontinuities of capacitance.

It has been known hitherto to pass the insulated wire or cable through a cutting device for shaving the insulation to a constant diameter and positioning the conductor centrally within the insulation to obtain a uniform capacitance. Prior to passing the wire cable through the cutting device, the axis of the conductor of the cable is controlled to coincide with an axis through the center of the cutting device so that uniform capacitance is obtained regardless of variation in eccentricity in the unshaved cable. The position of the wire or cable axis is usually controlled in response to feedback signals from a sensing device for detecting the eccentricity of the conductor within the insulation of the cable emerging from the cutting device.

SUMMARY OF THE INVENTION

According to the present invention there is provided an improved arrangement for controlling the position of the axis of cable of variable diameter moving in a direction parallel to its axis, comprising two pairs of guide members, the guide members of each pair being spaced apart on mutually opposite sides of the path of the cable, means for urging each of the guide members towards said path, the guide members of each pair being movable by equal amounts in mutually unlike sense in response to a change in diameter of the cable, and control means operable to move the guide members of each pair by equal amounts in mutually like sense for obtaining a required change of position of the axis of the cable, wherein the control means comprises levers coupled each to an individual one of the guide members, each control lever having a fixed pivot at the one of its ends coupled to the associated guide member and a floating pivot at the respective other one of its ends, and means for varying the distance between the floating pivots of the control levers coupled to the guide members of each said pair in accordance with said required change of position of the axis of the cable.

Embodiments of the invention will now be described with reference to the accompanying drawings.

BRIEF DESCRIPTION OF THE DRAWINGS

FIGURE 7 shows a block diagram of a system for controlling the elements of FIG. 1, and FIG. 8 schematically shows an arrangement for sensing cable parameters and for shaving the insulation in accordance with the invention.

Although the described embodiments relate to the manufacture of insulated wire or cable it is to be understood that an arrangement according to the invention may have other applications.

DESCRIPTION OF THE PREFERRED EMBODIMENTS

Figure 1:
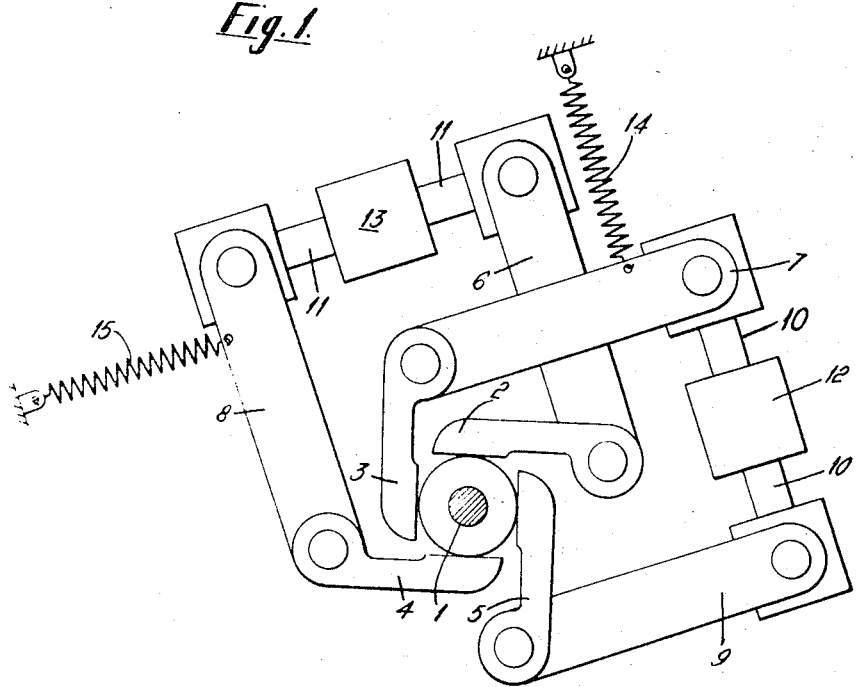
FIGURE 1 shows a schematic arrangement of levers for controlling the position of the axis of a cable.

Referring now to FIG. 1, there are provided guide levers 2, 3, 4 and 5 having guide surfaces for abutment with the insulator surface of conductor 1.

When an insulated conductor 1 is passed between the guide levers, guide levers 2 and 4 make contact with the insulator surface substantially at opposite ends of a first diameter of the insulated conductor, while the other guide levers 3 and 5 make contact substantially at opposite sides of a diameter at right angles to the first diameter.

Each of the guide levers 2, 3, 4 and 5 is coupled to an individual one of control levers 6, 7, 8 and 9 respectively. Each control lever has a fixed pivot at its end coupled to the respective one of the guide levers and a floating pivot at its other end. The floating pivots of control levers 7 and 9 and of control levers 6 and 8 are coupled by rods 10 and 11 respectively, whose lengths are adjustable by means of adjusting members 12 and 13. The adjusting members are controlled by a feedback arrangement such as that shown in FIG. 7 which will be described in more detail later, so that the axis of the conductor coincides with an axis through the center of a cutting device, shown in FIG. 8. Tension springs or equivalent 14 and 15, urge the guide surfaces of the guide levers towards the surface of the insulated conductors.

Figure 2:
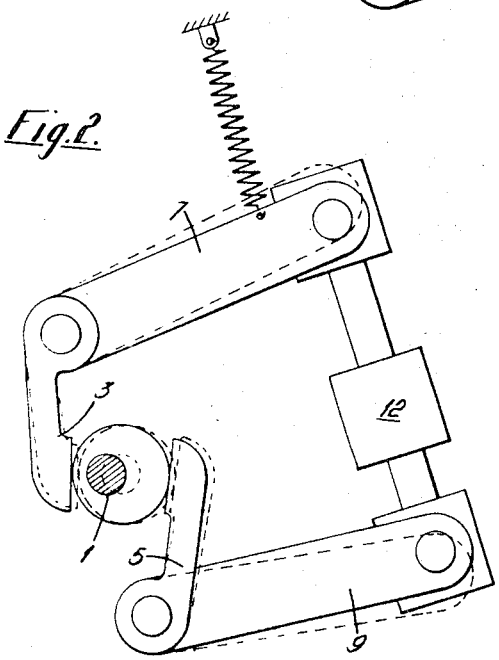
FIGURES 2 and 3 illustrate the operation of the embodiment shown in FIG. 1.
Figure 3:
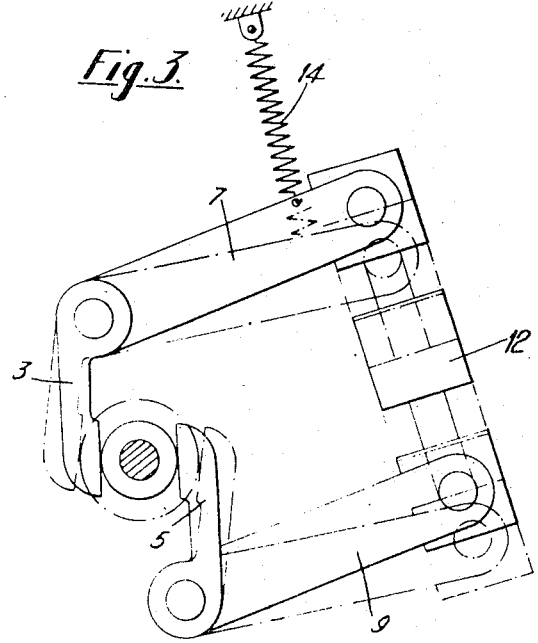

FIGURES 2 and 3 illustrate operation of the arrangement with the insulated conductor 1 moving between the guide levers in a direction perpendicular to its axis. For the sake of simplicity only two of the guide levers 3 and 5 are shown.

Suppose, first of all, with reference to FIGURE 2, that a portion of insulated conductor, in which the conductor is off center with respect to an oversized insulation, passes through the guide levers. In the example shown in FIGURE 2, the adjusting member 12 is controlled by feedback signals to increase the distance between the floating pivots of control levers 7 and 9 with a larger movement occurring between lever 7 and member 12, so that the control levers and guide levers move from the position indicated by solid lines to the position indicated by broken lines and the axis of the conductor again coincides with the axis through the cutting device. The excess eccentric insulator on one side of the conductor is then detected and shaved off by an arrangement such as shown in FIG. 8, to provide a uniform symmetrical cable.

FIGURE 3 illustrates the movement of members of the arrangement in the case of a low tolerance portion of insulated conductor of close to the correct position and size but lacking the marginal extra insulation nominally to be shaved off. The nominal size of the unshaved insulated conductor is indicated by broken lines. When such a portion, indicated by the solid lines, passes between the guide levers 3 and 5, they are caused to move inwards from the position indicated by broken lines to that indicated by solid lines, by the tension of spring 14 acting upon the control levers 7 and 9 and by movement of adjusting member 12 to rock them in the same direction about the fixed pivots. Guide levers 2 and 4 and control levers 6 and 8 move in a similar manner. When an undersized and out of tolerance portion of insulator is detected, it is preferably cut out, but may also be patched in a suitable manner.

Figure 4:
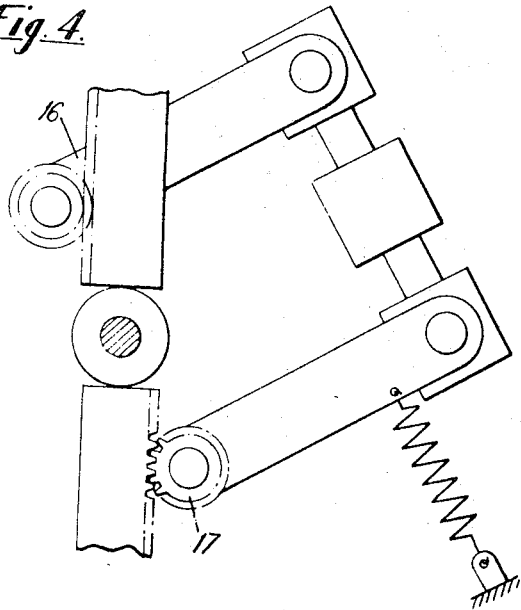
FIGURES 4, 5 and 6 show further embodiments of the invention.

FIGURE 4 shows a second embodiment in which each of the guide levers of the embodiment of FIG. 1 is replaced by a rack of an individual rack and pinion. For the sake of simplicity, only one of the two pairs of rack and pinion devices 16 and 17 is shown. The racks of these devices perform the same functions as the guide levers 3 and 5. Each control lever such as 16 and 17 is coupled to the end of its fixed pivot to the pinion of an individual one of the rack and pinions. A rack and pinion arrangement has the advantage that mutually opposite guide surfaces remain parallel when adjusting the eccentricity of the insulated conductor.

Figure 5:
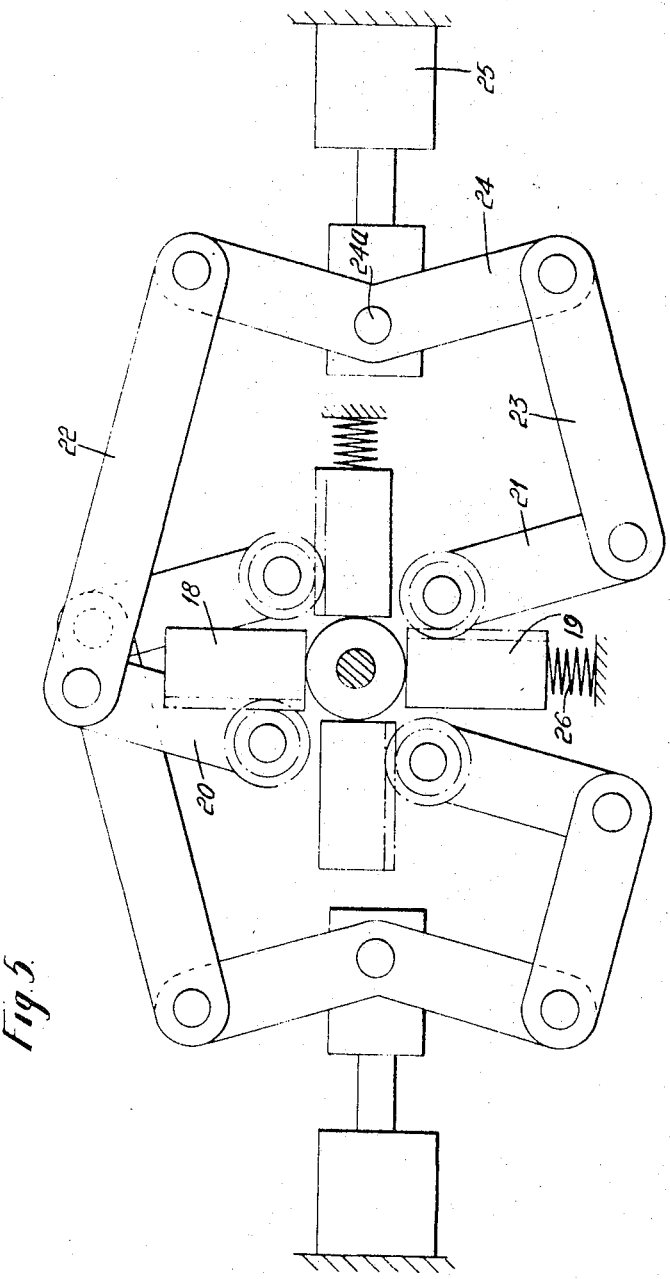

FIGURE 5 shows a modification of the embodiment shown in FIGURE 4. Although all four rack and pinion devices are shown in FIGURE 5, since the arrangement is the same for both pairs of mutually opposite rack and pinion devices, it will only be described with respect to one pair. The floating pivots of each of control levers 20 and 21, which are coupled to rack and pinion devices 18 and 19 respectively, are freely coupled to one end of an individual one of connecting links 22 and 23. The other ends of the links 22 and 23 are coupled together via a coupling member 24 which is pivotally mounted at 24a. In order to adjust the distance between the floating pivots of control levers 20 and 21, the pivotal point 24a of the coupling member 24 can be moved in a direction at right angles to the axis of the insulated conductor under the control of an adjusting member 25 which is responsive to feedback signal from a sensing device downstream of the cutting device, as shown in FIG. 8. The guide surfaces of the racks are urged towards the cable by means of a compression spring 26. An oversized portion of insulated conductor passing between the guide surfaces pushes the racks outwards, causing the coupling member 24 to rock about its pivot 24a.

Examples of devices suitable for use as the adjusting member for controlling the distance between the floating pivots of the guide members in any one of the preceding embodiments are hydraulic cylinders, pneumatic cylinders, adjusting screws, rack and pinion devices and gears.

Figure 6:
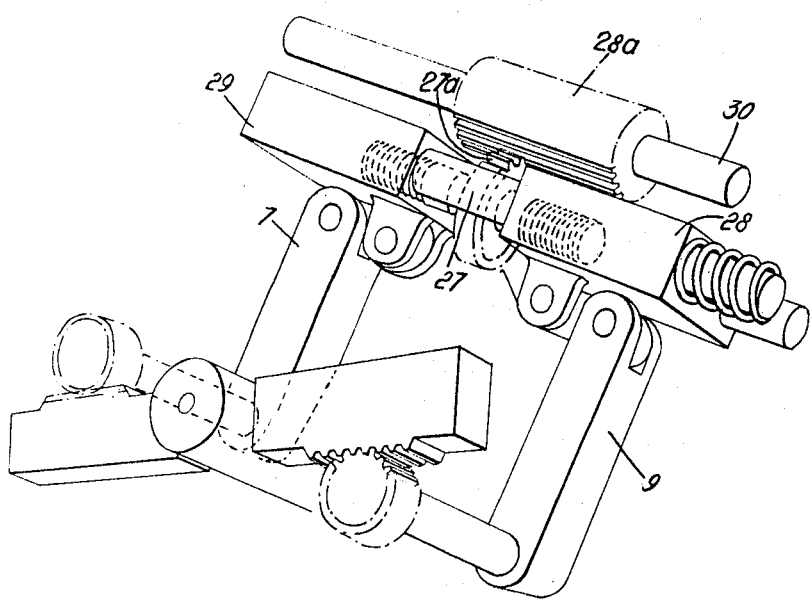

FIGURE 6 shows an elaboration of FIG. 4 in more detail, with straight tooth spur gears controlling the distance between the floating pivots of the control levers. One gear 27a of straight tooth spur gears 27a and 28a is mounted on a shank 27 having oppositely handed threaded end portions. The end portions of the shank 27 are in threaded engagement with blocks 28 and 29, each of which is coupled via a link member to the floating pivots of an individual one of control levers 7 and 9. The shaft 30 of the gear 28a is controlled by feedback signals from a sensing device downstream of the cutting device, and rotation of the shaft 30 causes rotation of the shank 27. Hence the blocks 28 and 29 move in mutually opposite directions and the distance between the floating pivots is adjusted.

FIGURE 7 shows a block diagram of a control circuit which may be used to sense the position of the cable elements and provide a signal to the control levers. Pairs of sensing electrodes 31, 32 are connected to respective capacitance bridges 33, 34.

In the sensing circiut of each bridge, the cable conductor is grounded and eccentricity of the conductor is sensed by detection of capacitive unbalance between each pair of opposite electrodes and earth. The sensing electrodes are shown in further detail in FIG. 8. The bridge gives an output signal at 10 kc.p.s. having an amplitude depending on the degree of unbalance and an instantaneous polarity depending on the sense of the unbalance.

A phase discriminator 35, 36 converts the bridge output signal to a unidirectional signal having a magnitude dependent on the input amplitude and a polarity dependent on the phase of the bridge output signal relative to output voltage from an oscillator 37. As can be seen from FIG. 8, the eccentricity control device operates on the cable core entering the shaving head and the bridge detects inadequately corrected eccentricity in the cable core leaving the shaving head, which rotates about the core moving through it.

It is to be understood that the foregoing description of specific examples of this invention is made by way of example only and is not to be considered as a limitation on its scope.

What I claim is:

1. An arrangement for aligning the axis of an elongated article of variable diameter moving in a direction parallel to its axis with respect to a predetermined reference position comprising two pairs of guide members, the guide members of each pair being spaced apart on mutually opposite sides of the article, means for urging each of the guide members towards said article, the guide members of each pair being movable by equal amounts in mutually unlike sense in response to a change in diameter of the article, and control means operable to move the guide members of each pair by equal amounts in mutually like sense for obtaining a required change of position of the axis of the article with respect to said reference position wherein the control means comprises levers coupled each to an individual one of the guide members, each control lever having a fixed pivot at the one of its ends coupled to the associated guide member, and a floating pivot at the respective other one of its ends, and means for varying the distance between the floating pivots of the control levers coupled to the guide members of each said pair in accordance with said required change of position of the axis of the article.

2. An arrangement according to claim 1, wherein each said guide member is a lever having a guide surface at one of its ends for contact with the article, and wherein the respective other ends of said guide levers are each secured to an individual one of said control levers.

3. An arrangement according to claim 1, wherein each said guide member comprises a rack portion of a rack and pinion and a guide surface at one of its ends for contact with the article, and wherein the control lever is provided at its fixed pivot with a pinion in engagement with said rack.

4. An arrangement according to claim 1 wherein the means for varying the distance between the floating pivots comprises an individual coupling member between the floating pivots of the control levers coupled to the guide members of each said pair.

5. An arrangement according to claim 4, wherein the coupling member comprises a shank provided with oppositely handed threaded end portions which are in threaded engagement with surfaces of members individually coupled to one of said other ends of the levers, and wherein said control means comprises straight tooth spur gears for rotating the shank.

6. An arrangement according to claim 3, wherein the means for varying the distance between the floating pivots comprises further levers each freely coupled at one of its ends to said other end of an individual one of the control levers and at the respective other one of its ends to a coupling member, and wherein said control means comprises means for producing linear movement of the coupling member.

7. An arrangement according to claim 1 wherein the elongated article comprises an insulated conductor and including a cutting device for shaving the insulation, means for sensing the position of the axis of the conductor with respect to the axis of the cutting device and the dimensions of said insulation, and wherein said means for varying the distance between the floating pivots is responsive to signals from said sensing means to align the axis of the conductor with the axis through the center of said cutting device and to provide for subsequent shaving of the insulation.

8. The device of claim 7 wherein said sensing means comprises pairs of electrodes positioned at opposite sides of said insulated conductor and capacitance measuring means connected to said electrodes to detect eccentricity and changes in the capacitance of said insulated conductor.

References Cited

UNITED STATES PATENTS 3,128,658    4/1964    Mitchell et al. _____ 82—20

FOREIGN PATENTS 609,591    11/1960    Canada.

LEONIDAS VLACHOS, *Primary Examiner.*

U.S. Cl. X.R.

82—38